United States Patent [19]

Lee

[11] Patent Number: 4,616,709

[45] Date of Patent: Oct. 14, 1986

[54] PODDED CLEAT HORSESHOE

[76] Inventor: James M. Lee, 351 Warwick Ave., South Orange, N.J. 07079

[21] Appl. No.: 704,183

[22] Filed: Feb. 22, 1985

[51] Int. Cl.⁴ .......................... A01L 5/00; A01L 7/06
[52] U.S. Cl. .................................................. 168/13
[58] Field of Search ................. 168/11, 12, 13, 26, 168/28, 29

[56] References Cited

U.S. PATENT DOCUMENTS

| | | |
|---|---|---|
| 43,747 | 8/1864 | Griswold . |
| 331,628 | 12/1885 | Gardner . |
| 516,788 | 3/1894 | Eulenfeld . |
| 667,262 | 2/1901 | Stroud et al. .................... 168/13 |
| 832,162 | 10/1906 | Rothwell et al. . |
| 839,432 | 12/1906 | Smith .................... 168/13 |
| 844,121 | 2/1907 | Goodwin . |
| 863,386 | 8/1907 | Hallanan .................... 168/28 |
| 965,594 | 7/1910 | Moffett et al. .................... 168/13 |
| 1,019,493 | 3/1912 | Kyle . |
| 1,089,965 | 3/1914 | Richard . |
| 1,100,670 | 6/1914 | Curley .................... 168/28 |
| 1,131,858 | 3/1915 | O'Neill . |
| 3,090,718 | 5/1963 | Dixon .................... 168/13 X |
| 4,122,900 | 10/1978 | Barr et al. .................... 168/12 |
| 4,207,947 | 6/1980 | Cope et al. .................... 168/4 X |

Primary Examiner—Robert P. Swiatek
Attorney, Agent, or Firm—Holman & Stern

[57] ABSTRACT

A shock absorbing and protective form of a horseshoe comprises a base that conforms to the shape of the perimeter of the horse's hoof, and from which protrudes a series of podded cleats that are strategically aligned and positioned below the horn of the hoof providing the prerequisite support for the horse. Each podded cleat has an internal air chamber, that when combined with the complying shape of the external wall allows partial or full collapse or deflation of this structural element effecting a most significant degree of cushioning, thus allowing a relatively high durometer elastomer for composition that would not otherwise provide sufficient compressibility, but having physical properties that surmount the factors of abrasion and wear and where such hard materials are identifiable as having a low frictional resistance in comparison to highly compressible, soft elastomers. The invention, wherein the action of the podded cleat is the inward, upward mechanical collapse, is enhanced with the memory retention of given elastomeric compounds thus allowing the podded cleat to recover upon release of load and reattain its original shape and dimensional form.

15 Claims, 6 Drawing Figures

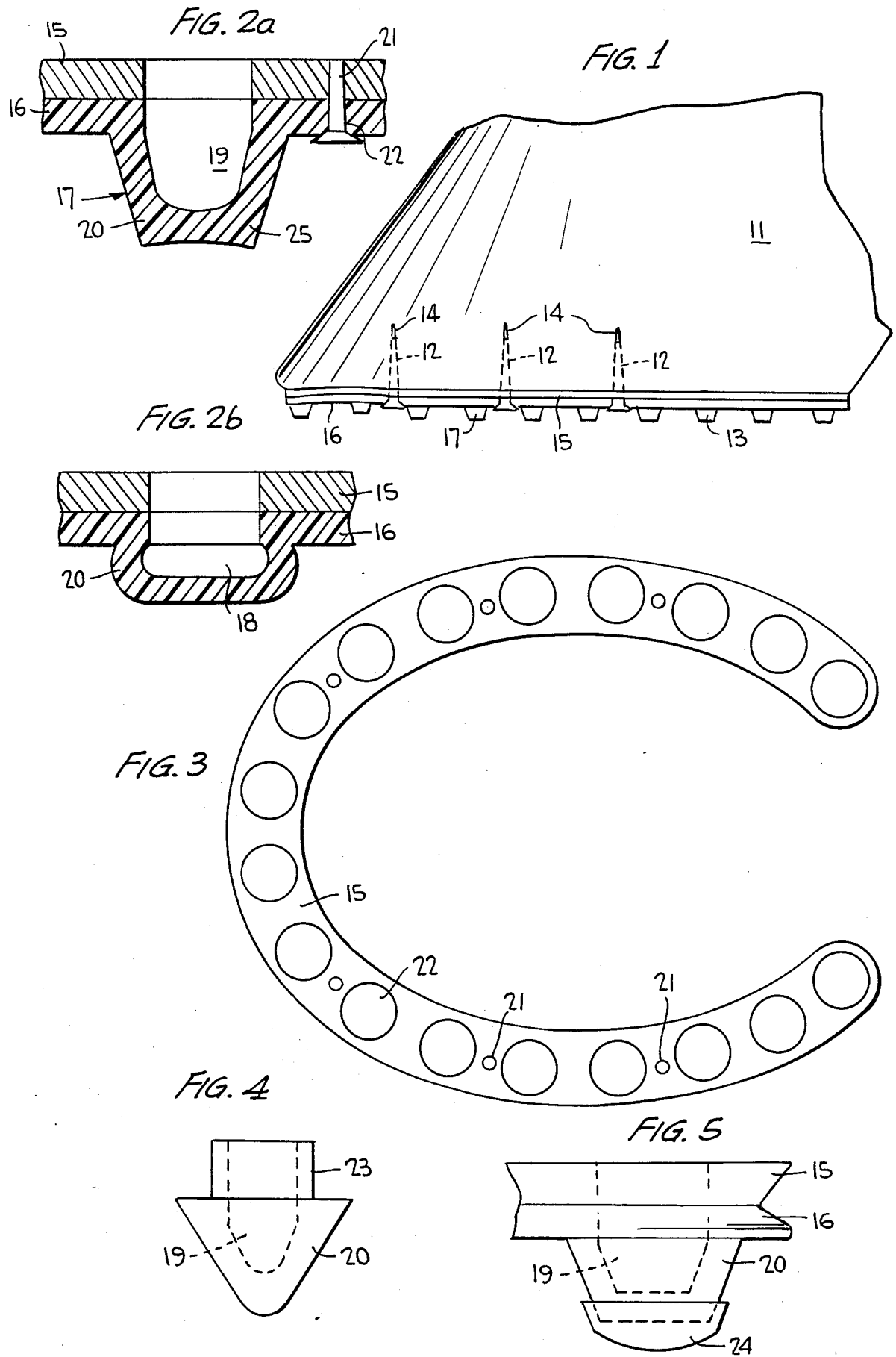

PODDED CLEAT HORSESHOE

BACKGROUND OF THE INVENTION

1. Field of the Invention

This invention relates to horseshoes, and in particular to a type of horshoe that can provide a cushioning effect that is not determined by the compressibility of any given material, but by the application of design where the occurrence of a displacement of material provides a means of reduction of impact while maintaining an integral, supportive structure.

2. Description of the Prior Art

The type of horseshoes in use that have the objectives of a cushioning effect for the horse are generally formed of a molded polymeric elastomer or rubber based elastomeric compound, and such horseshoes consist of a solid cross section of material. The ability of such horseshoes to absorb impact is based exclusively upon the physical properties of the elastomer to compress under load and thusly achieve a means of a cushioning effect. In order to pursue any considerable degree of longevity, and to provide a fairly high resistance to abrasion, such horseshoes are generally formed of elastomers that can be considered as being dense, hard materials and as a result of the hardness of the elastomeric compound the action of material compression is severely diminished and the cushioning effect for a horse's hoof is negligible.

BRIEF SUMMARY OF THE INVENTION

It is a principle object of the invention to provide a horseshoe that is capable of compression under load by design independent of the physical characteristics of that material that would allow for compression. The function of the horseshoe's podded cleats to momentarily collapse upon impact, and to have such formed sections regain their full shape and form allow for a more substantial cushioning effect than could otherwise be accomplished solely through material compression. It is an object of the invention to form, as an integral part of the horseshoe, a series of podded cleats that extend downward from the base of the shoe, and that each protruding section shall provide initial contact with the ground, that each podded cleat shall be collapsible by design in that the structure is formed in the manner of having an internal chamber allowing the surrounding wall to be displaced inwardly, and that the wall of the cleat shall resume the shape and form of the original configuration upon release of load due to the memory retention properties of the given elastomeric compounds.

In accordance with these objects, this invention provides a significant level of cushioning effect to occur within and by a horseshoe. The mechanics of the system, comprising the horseshoe, for diminishing the degree of impact is through the creation of podded cleats as an integral section of the formed horseshoe, so that each of the cleats would partially, or to the full extent, collapse inwardly due to the chambered design.

Clearly, an objective for the compressed cleats to reassume their original dimensional forms upon release of load and following a compressive state is achievable by the memory retention properties of many elastomeric materials.

This invention provides a means of implementing use of a relatively dense and hard elastomer, that in itself would provide a minimal degree of resiliency through direct compression of the material, and to gain the recognizable low measurement of frictional resistance that dense and hard materials normally afford. It is the intent to directly avoid such elastomeric materials of the prior art for compressibility under load, which are generally only moderately hard compounds and offer a limited degree of wear and a low resistance to abrasion, and have measurable distortive properties incurring component loosening.

In a further embodiment of the invention a structural element for attachment of the horseshoe to the horn of the hoof is provided. By means of a metal plate, to which the elastomeric formed horseshoe section is permanently bonded, a plurality of nails may be used for affixing the horseshoe to the hoof. This metal plate is shaped to the approximate width and contour of the horse's hoof, and through secure attachment of the metal plate to the horn of the hoof, using a series of nails, the possibility of component loosening is substantially less than with horseshoes formed entirely of an elastomeric compound or polymeric material where pliability and elongation under load may result in the horseshoe separating from the hoof.

It is still a further object of this invention to provide an arrangement of podded cleats aligned specifically to achieve support of the horn of the hoof, this being the structural element of the hoof, and to produce an equalized displacement of the load through compression of the podded cleats. The cleat, having an internal chamber, may be of a variety of shapes and have multiformity in alignment and number of the podded cleats while still achieving the desired cushioning effect.

It is the objective of the invention to provide a cleat which performs the displacement of material under impact and load rather than the direct compression of material itself. The cleat is comprised of an internal chamber with a surrouding wall of material, which is preferably a hard, dense elastomer, where such cleats may be formed as an integral section of the horseshoe, or may be formed independent of the horseshoe but attached by any method or fastening device in order to achieve the end result which is a mechanical compressibility action of a horseshoe.

BRIEF DESCRIPTION OF THE DRAWINGS

Preferred embodiments of this invention are presented in the accompanying drawings, wherein:

FIG. 1 is a side elevational view of a horse's hoof fitted with a horseshoe in accordance with an embodiment of the invention;

FIG. 2a is an enlarged vertical cross-sectional view of the part shown circled in FIG. 1;

FIG. 2b is a view similar to FIG. 2a showing a podded cleat subjected to a compressive force;

FIG. 3 is a top plan view of the horseshoe only shown in FIG. 1;

FIG. 4 is a side elevational view of a second form of podded cleat of a different embodiment of this invention; and FIG. 5 is a partial side elevational view of the arrangement shown in FIGS. 1 and 2a showing a further embodiment within the scope of this invention.

DESCRIPTION OF THE PREFERRED EMBODIMENTS

Referring to FIG. 1, there is shown, in outline, the structure of a horse's hoof 11, which is comprised of a keratinous substance that constitutes the peripheral region known as the horn. It is the horn that is the structural and supporting member and into which nails are imbedded for attachment of the horseshoe, as readily recognized by prior art. These nails are forced into the substrate of the horn at an angle to assure an outward penetration by the nail through the wall of the hoof, where the end of the nail is to be trimmed and cleated over.

FIG. 1 shows in a side elevation a multi-element horseshoe 10 attached directly to the base of the hoof 11 with a series of nails 12. In accordance with this invention, the horseshoe has a plurality of integrally formed pods 13 that are aligned with the peripheral horn of the hoof for essentially placed support. It is shown that each nail 12 is inserted through the horseshoe 10 and driven in an upward direction into the horn of the hoof. The ends 14 of these nails are shown to emerge from the hoof at a distance from the horseshoe where such ends are to be trimmed and angled downward to prevent the nail and subsequently the horseshoe from loosening in engagement with the hoof. In accordance with FIG. 1, an integral part of the horseshoe 10 is a metal plate 15 that is in direct contact with the bottom of the hoof 11, and this section conforms with the peripheral contour of the horn and is the skeletal system of the horseshoe where the metal contoured plate 15 provides a restraint against lateral forces, and forms the rigid, non-elongating member against which the heads of the nails 12 may be driven to secure the horseshoe to the hoof. By means of chemical bonding during the manufacturing process a permanent bond occurs between the metal plate 15 and the complying in shape, lower elastomeric section 16 of the horseshoe. From this lower element project numerous podded cleats 17, within each of which is an internal cavity 19. The podded cleats 17 are aligned directly beneath the horn of the hoof to provide the supportive measure necessary for the horse. Such cleats may be greater in size or differentiate in other fashions to accomplish the cushioning effect where such absorption of impact and stress is critical upon a specific area of the hoof. The drawing is illustrative of the invention as it relates to the placement of the cleats along the perimeter of the hoof without designating the manner of cleat alignment and differences in sizing to improve the performance and shock absorptivity of the horseshoe.

FIG. 2a, which is a partial cross-sectional view of the arrangement shown in FIG. 1 of that drawing, shows one podded cleat 17 and the adjacent nail 12. This figure shows the formation of an internally structured air chamber 19 which extends from the top of the horseshoe through the metal plate 15 and part of the lower elastomeric form 16 and well within the form of the cleat 17. The internal chamber is maintained at neither a negative or positive air pressure level. It provides a means of methodically displacing the formed material that comprises the surrounding wall 20 under impact and load, which is translated into a means of absorbing shock that is not reliant upon any compressible properties of the material. It is due to the internal cavity 19 that the encompassing hull 20 has a degree of elasticity and memory retention to assure sufficient recovery of the cleat to its given dimensional shape and form when not under compressive loading. It is also a prerequisite that the elastomeric material forming the cleat be of substantial hardness to reduce the abrasive wear that a horseshoe is clearly subjected to in use. Such dense compounds would offer negligible compressibility. It is seen in FIG. 2a that the external wall 20 is angled so as to facilitate a desired form of mechanical collapse, and that the internal chamber 19 has a form that is in compliance and relationship with the outer wall to maintain a consistent thickness of wall section to assure the effect of the mechanical collapse of the cleat under impact and load, as shown in FIG. 2b, where the podded cleat is shown fully subjected to a load bearing weight causing the internal chamber to distort and permitting the walled section of the cleat 20 to collapse in an upward motion. The dispersement, or displacement, of formed material rather than direct compression of the material is illustrated in this figure and is the means of producing the cushioning effect. The distortion caused by the collapse of the cleat does not alter the position of the metal plate 15 nor change the distance between the metal plate and that of the base of the hoof, due to the securement of the horseshoe through the utilization of nails. The importance of the memory retention of the elastomeric material is emphasized in this figure where the fully compressed and distorted cleat must recover from the compressive state and reattain the original dimensional shape and form of the cleat. Such viscoelastic physical properties are identifiable with a range of elastomeric compounds. Taking the above into account, it is seen that a rubber based material, such as a high carbon black carboxylated nitrile is highly suitable for the forming of the majority of the horseshoe, although other types of materials may be found equally suitable for this application. Further, the material may be reinforced with fibers, such as shown at 25 for example, to, in part, effectively diminish wear under abrasive conditions that a horseshoe is normally subjected to.

Referring now to FIG. 3, which is a top view of the horseshoe only shown in FIG. 1, it is shown that within and as an integral part of the horseshoe is a metal plate 15 that is shaped to conform with the configuration of the perimeter of the horse's hoof. By use of a metal alloy, such as a 6063 T651 aluminum, this metal plate is malleable and can be further shaped by a person knowledgeable in the field of shoeing horses to adopt this generalized shape to conform with any hoof, each of which has a different size and shape to a greater or lesser degree. The function of the metal plate is, in part, to accommodate placement and securement of nails through apertures 21 at predetermined points. The metal plate provides a support against which the head of the nail may be driven firmly. The non-linear expansion aspect of the metal assures that the horseshoe cannot elongate and slip beyond the head of the nail, as would certainly occur without this structural element due to the limitations of any elastomeric material to securely sustain an inserted metal part. It is further shown in this figure that the width of the metal plate and the conformity to the general shape of the hoof provides proper support to the horn of the hoof. Furthermore, the configuration of the metal piece 15 in combination with the ascribed thickness of the metal make the functionary role as a restraint against lateral expansion more readily discernible in this view. The openings 22 of the metal section are coordinated in position with the chambers 19 in podded cleats 17, since in the manufacture of the horseshoe in order to achieve a means of creating the internal cavity a core, or pin, placed into the cavity of the mold, would consequentially also penetrate the metal part. The elastomeric material formed inside the apertures 22 of the metal is chemically bonded to the metal during the molding process as is also the additional rubber that may extend beyond the perimeter of the metal part, as a protective measure to prevent any edges of the metal which may be sharp from injuring the horse.

FIG. 4 is a side view of a second form of podded cleat within this invention where the cleat is formed independent of the metal substrate or plate 15 that would be in direct contact and attachment with the hoof of the horse. Utilizing this variation of the invention it would be possible to attach compressible type cleats into a metal horseshoe by means of an insert 23 that is formed as an integral section. This insert may be a threaded ring or other type of fastener found suitable for securement. The intent in the forming of the podded cleat as an independent but securely fastened component is to allow replacement of the cleats without necessitating removal nor replacement of the metal interrelated horseshoe. As previously shown in the drawings, all cleats maintain an internal chamber 19 and encompassing wall 20 to completely facilitate the mode of compression for the cushioning effect. And as can be gleaned from the figures, there are variances as to the modified shape, contour and form of the cleat that can be determined in keeping with of the invention.

Referring now to FIG. 5, which is a side view of the arrangement shown in FIGS. 1 and 2a, there is shown the podded cleat upon which a metal cap 24 is chemically and permanently bonded. Although the cleat is fully compressible due to the action of an internal core 19 and the surrounding wall 20 that is related in form, to increase the resistance to abrasive wear the inclusion of metal caps provides additional longevity for the horseshoe and protection of the elastomeric material.

It is to be understood that the invention is not limited to the illustration described and shown herein, which are merely illustrative of the best modes of carrying out the invention, and which are suitable in modification of form, arrangement of materials and details of form. The invention rather is intended to encompass all such modifications which are within the spirit and scope as defined by the claims.

I claim:

1. A horseshoe comprising:
   a base member for attachment to a horse's hoof as a lower part thereof and having a bottom surface; and
   a plurality of podded cleats extending generally downwardly from the bottom surface of said base member in spaced relationship along at least the area of said bottom surface adjacent the peripheral region thereof to support the horn of the hoof around the peripheral region thereof;
   each podded cleat comprising
   a pod of elastomeric material protruding from the bottom surface of said base member, and a hollow cavity within said pod having a size and shape relative to the dimensions of the pod to form a wall surrounding said cavity which facilitates substantial compression of the pod under impact and compressive load by mechanical collapse of said wall to maximize cushioning of the impact and load on the horse's hoof in use.

2. A horseshoe as claimed in claim 1 wherein:
   said elastomeric material has resilient properties which in combination with the shape and size of said pods and hollow cavities therein restore said cleats to a given form upon release of the compressive load.

3. A horseshoe as claimed in claim 2 wherein:
   said cleats are aligned in spaced circumferential array, and vary in size, number and arrangement with respect to said base member and each other to accommodate specific impact and load bearing forces for specific areas of the hoof.

4. A horseshoe as claimed in claim 1 and further comprising:
   reinforcing filaments within said elastomeric material for improving resistance to wear and abrasion of the cleats; and wherein
   the composition of said elastomeric material promotes resilient displacement of said cleats under compressive load toward said base member.

5. A horseshoe as claimed in claim 1 wherein:
   said base member comprises a rigid metal plate having a shape to support the horn of the hoof in contact therewith;
   said podded cleats are attached to said metal plate along the entire peripheral region thereof;
   holes are provided in said metal plate aligned with said cavities so that said cavities extend through said metal plate; and
   means are provided on said metal plate to facilitate attachment of said metal plate to the horn of the hoof.

6. A horseshoe as claimed in claim 5 wherein:
   said base member further comprises a layer of elastomeric material on the bottom of said metal plate and attached to said metal plate to form a laminated base member, said cleats being integral with said elastomeric material layer; and
   holes are provided through said elastomeric material layer aligned with said cavities so that said cavities extend through said laminated base member.

7. A horseshoe as claimed in claim 6 wherein:
   each clat is in the form of a truncated cone having the larger base thereof adjacent said base member.

8. A horseshoe as claimed in claim 7 and further comprising:
   a metal cap attached over the outer surface of each cleat for protection against abrasive wear.

9. A horseshoe as claimed in claim 6 wherein:
   said rigid metal plate is embedded in said layer of elastomeric material.

10. A horseshoe as claimed in claim 9 wherein:
    each cleat is in the form of a truncated cone having the larger base thereof adjacent said base member.

11. A horseshoe as claimed in claim 10 and further comprising:
    a metal cap attached over the outer surface of each cleat for protection against abrasive wear.

12. A horseshoe as claimed in claim 1 wherein:
    said base member comprises a planar element of elastomeric material integral with said cleats; and
    holes are provided in said planar element aligned with said cavities so that said cavities extend through said planar element.

13. A horseshoe as claimed in claim 12 wherein:
    each cleat is in the form of a truncated cone having the larger base thereof adjacent said base member.

14. A horseshoe as claimed in claim 1 wherein:
    each cleat is in the form of a truncated cone having the larger base thereof adjacent said base member.

15. A horseshoe as claimed in claim 1 and further comprising:
    a metal cap attached over the outer surface of each cleat for protection against abrasive wear.

* * * * *